United States Patent [19]
Rouverol

[11] 3,982,444
[45] Sept. 28, 1976

[54] CONSTANT TOOTH-LOAD GEARING

[76] Inventor: William S. Rouverol, 52 Lovell Ave., Mill Valley, Calif. 94941

[22] Filed: May 30, 1975

[21] Appl. No.: 582,088

[52] U.S. Cl. ................................................. 74/462
[51] Int. Cl.² ........................................ F16H 55/06
[58] Field of Search .................... 74/457, 462, 460

[56] References Cited
UNITED STATES PATENTS 3,292,390  12/1966  Wildhaber ..................... 74/462 X
3,824,873  7/1974  Rouverol ............................ 74/462

*Primary Examiner*—Leonard H. Gerin
*Attorney, Agent, or Firm*—Gordon Wood

[57] ABSTRACT

Gear silhouettes in the axial plane are tailored to give substantially constant tooth load per unit length of contact are as well as constant position of the resultant tooth load, even though the number of teeth in contact fluctuates. These tailored silhouettes help to minimize noise, bearing vibration and dynamic-load tooth-stresses.

20 Claims, 17 Drawing Figures

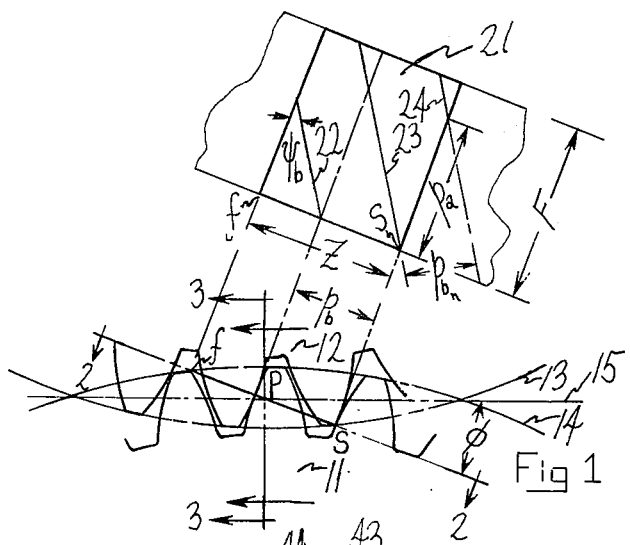
Fig 2
Fig 1
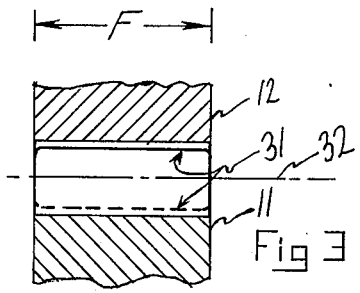
Fig 3
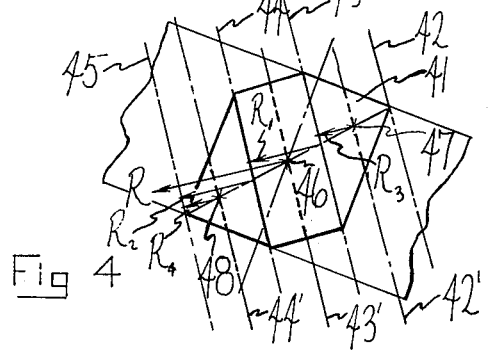
Fig 4
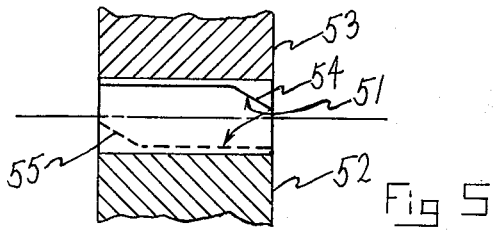
Fig 5
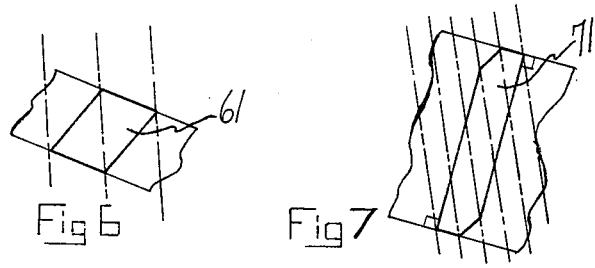
Fig 6   Fig 7
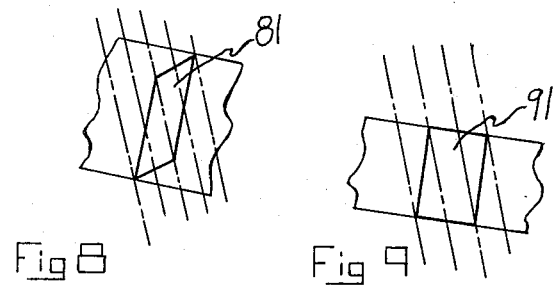
Fig 8   Fig 9
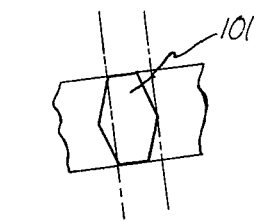
Fig 10
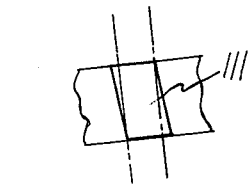
Fig 11
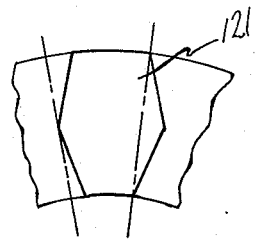
Fig 12
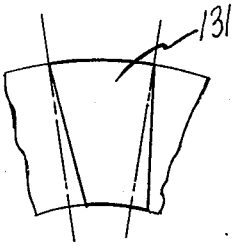
Fig 13
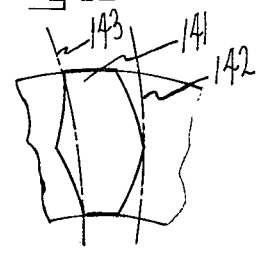
Fig 14
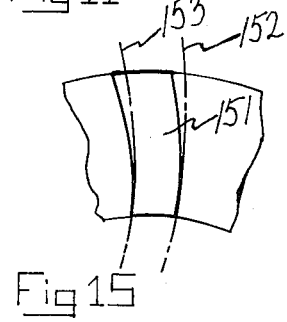
Fig 15
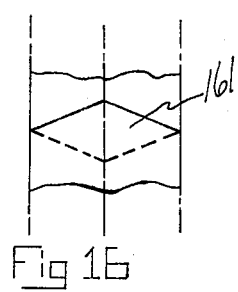
Fig 16
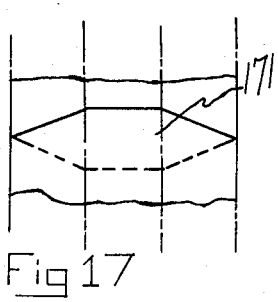
Fig 17

CONSTANT TOOTH-LOAD GEARING

In all gearing the number of teeth in mesh varies with the rotational position of the gears. In spur or straight bevel gears, for example, the transverse contact ratio is nearly always between 1 and 2, so that for part of the cycle the load is transmitted by one tooth, the rest by two teeth. For gears with a substantial helix or spiral angle and a wide face, the variation may be back and forth between 3 and 4 teeth or 4 and 5 teeth, or in some gear sets, even more. In either case the load per unit length of tooth face will fluctuate and the position of the resultant tooth load will vary slightly, contributing in some cases quite significantly to noise, bearing vibration (especially at the natural frequencies of the system) and dynamic-load tooth-stresses.

The object of the present invention is therefore to provide gear tooth forms that have a constant load per unit length of tooth face and a constant position of the resultant load, so that operation wll be as smooth and quiet as possible.

The means to achieve these and other objects and advantages of the invention will be evident from the drawings and specifications that follow:

FIG. 1 is a partial section or end view of an ordinary helical involute gear, showing the line of action.

FIG. 2 is a section through FIG. 1 along the line 2—2, showing the "field of contact".

FIG. 3 is a section through FIG. 1 along the line 3—3, so that it contains the gear axes and shows how the field of contact defines the gear silhouettes and vice versa.

FIG. 4 is a view similar to FIG. 2, but showing a field of contact embodying the invention.

FIG. 5 is a view similar to FIG. 3, but showing silhouettes for gears embodying the invention.

FIGS. 6–17 are views similar to FIGS. 2 and 4, showing the field of contact for various gears embodying the invention.

In detail, and referring to the drawings, in FIG. 1 a conventional helical involute gear 11 rotates counterclockwise and drives its mating gear 12 clockwise. The line of action $s$–$f$ starts at the addendum circle 13 of the driven gear 12 and ends at the addendum circle 14 of the driving gear 11, and makes an angle $\phi$ with the common tangent plane 15.

FIG. 2 is a section through FIG. 1 in the direction 2—2, so that it shows the field of contact 21 unforeshortened. The length of the field 21 will be the length $z$ of the line of action $s$–$f$, and its width the active face width F. In the case of conventional helical gears such as shown in FIGS. 1–3, the field 21 is always rectangular.

In FIG. 2 three equally spaced parallel lines 22, 23, 24 cut the field at an angle $\chi_b$ with the sides of the rectangular field 21. This angle is called the base helix angle and is equal to the following:

$$\chi_b = \tan^{-1}(\tan\chi \cos\phi) \qquad 1.$$

where $\chi$ is the helix angle and $\phi$ the transverse pressure angle. Physically, the base helix angle is the helix angle on the base circle.

The lines 22, 23 and 24 are what will be called "load lines" in this specification. They each represent an edge view of a contact area between engaged teeth such as shown in FIG. 1. As the gears 11, 12 turn, these load lines sweep across the field of contact 21, maintaining a constant spacing equal to the normal base pitch $p_{bn}$. The equation for the normal base pitch is:

$$p_{bn} = p_b \cos\chi_b \qquad 2.$$

where $p_b$ is the base pitch (the pitch on the base cylinder):

$$p_{bn} = p \cos\phi \qquad 3.$$

where $p$ is the circular pitch. The intersection of adjacent load lines such as 23 and 24 with the sides and ends of the field of contact 21 define the base pitch $p_b$ and axial pitch $p_a$ respectively.

It will be observed in FIG. 1 that if the line of contact is projected onto a plane containing the gear axes (the "axial plane") the length of this projection is simply the working depth of the teeth. The entire field of contact 21, if projected into this axial plane, will simply be a smaller rectangle (31 in FIG. 3) which has the same width F as the field, but which has vertical proportions that have all been reduced by a foreshortening coefficient C equal to the ratio of the tooth working depth $2a/P_{d_n}$ to the length of the line of action $z$:

$$C = 2a/zp_d = 2a \cos\chi/\pi r_t \cos\phi \qquad 4.$$

where $r_t$ is the transverse contact ratio:

$$r_t = z/p_b \qquad 5.$$

and $p_{d_n}$ is the normal diametrical pitch. The lengthwise boundaries of the projected field of contact 31 are of course the intersection of the addendum surfaces of the mating gears 11, 12, with the axial plane.

While FIGS. 1, 2 and 3 are illustrations of a conventional helical gear and are intended only to explain the nomenclature of the specification, FIG. 4 shows a field of contact embodying the invention. In this figure the rectangular field of contact 21 of FIG. 2 has been changed to a hexahedron 41, opposite sides of which are parallel. The load lines 42, 43, 44 and 45 are equally spaced and sweep across the field 41 as the gears rotate. In the position shown, all of these load lines 42, 43, 44 and 45 intersect the corners of the field 41 simultaneously, and this is essential to achieving the desired effect.

If the load is uniform over the portion of the load lines that lie within the field of contact 41, (as it will be for a correctly aligned and not too severely worn involute gear), the resultant forces $R_1$ and $R_2$ that are summations of the distributed tooth loads will act at the centers of those portions. The two resultants $R_1$ and $R_2$ may also be replaced by their resultant R, which acts halfway between them at 46, since $R_1$ and $R_2$ are equal for the load-line position shown.

When the gears 11, 12 are rotated slightly, the load lines 42, 43, 44 move to the left. During this movement they will occupy other positions 42', 43', 44' respectively, one-half a normal base pitch distant from their previous positions. In this second position there will be one effective load line passing through point 46 having a resultant that is the same in magnitude and direction as $R_1$ or $R_2$. In addition, the load lines 42' and 44' will have effective portions that bisect opposite sides of the field 41. These load lines will have resultants $R_3$ and $R_4$ acting at their midpoints 47, 48 respectively. These resultants $R_3$ and $R_4$ are half as large as $R_1$ or $R_2$ and can be combined into a single resultant that because of the polar symmetry of the field 41 will also act at 46 and will be of the same magnitude as $R_1$ or $R_2$. The total resultant of the three forces acting at 46 will therefore be exactly as it was in the case of the initial position of the load lines. If the load lines are moved to any other position, it will be found that the magnitude and position of the total resultant tooth load remains the same.

This is the unique and useful characteristic of the invention. The fact that the resultant force is invariant means that for constant torque throughput, the load per unit length of tooth remains constant. This gives the steadiest possible output speed, the least tooth and bearing vibration and the lowest noise level for a given speed and contact ratio.

The projection of the field 41 of FIG. 4 onto the axial plane produces the narrower hexahedron 51 shown in FIG. 5. As in the case of FIG. 3, the axial dimensions are the same as those of the field 41, but the dimensions in the direction of motion have been foreshortened by the coefficient C of Eq. 4. The required silhouetttes are given to the gears 52, 53 by utilizing conical bevels for part of the addendum surfaces at 54 and 55 respectively.

It should be noted that there are two ways tooth load can vary, aside from the inequalities that result from shaft misalignment or tooth machining error. If a constant torque is being transmitted, the magnitude of the resultant tooth load will have a constant average value. If there is a variation in the sum of the lengths of the load lines, however, then the load per unit length of load line ("specific tooth load") must vary inversely. This means that the surface stress and bending moment applied to the teeth locally fluctuates during the engagement-disengagement cycle, and this makes a sizeable contribution to gear noise, especially in spur or straight bevel gears and in helical or spiral bevel gears of narrow face width.

The second way tooth load can vary is from fluctation of the position of the resultant tooth load. If the resultant tooth force shifts back and forth in the lengthwise direction of the teeth as the gears rotate, small oscillations are induced that impose a cyclical variation in the tooth stresses, especially at the ends of the teeth, as well as vibration of the mounting bearings. Both effects add to the noise level of the gear set and shorten its service life. This kind of instability is especially significant in high conformity gears of the Novikov type and in helical or spiral bevel gears having total contact ratios less than about three.

Either or both these types of variation in tooth load can be eliminated by providing a suitable shape or "silhouette" to the tooth ends and addendum surfaces. Silhouettes that eliminate either type of tooth load variation will afford improved performance, but those that eliminate both types, such as that of FIG. 5, are doubly advantageous and comprise the preferred embodiments of the invention. The conditions that the gear silhouettes must be shaped to meet in order to eliminate each of these types of variation are as follows:

Condition 1, for maintaining a constant specific tooth load:

The change of length of any load line produced by a small rotation of the gears must be either zero or be balanced out by the simultaneous change in at least one other load line.

If the length of a particular load line is plotted as a function of its distance from the point where it first enters the field of contact, the resulting curve will have a beginning portion that rises from zero to a maximum value and a final portion that falls from that value back to zero, and in many cases a central portion with a constant ordinate at that same maximum value. If the generating elements for the gear tooth ends and addendum surfaces of revolution are straight lines, these beginning and final portions will also be straight lines, and their widths as well as that of any central portion will be integral multiples of the normal base pitch.

As an example, a plot of the length of a load line for the gears of FIGS. 4 and 5 will have the shape of an equilateral trapezoid having a base equal to three times the normal base pitch and a top side one-third as long. If the same plot is redrawn on the same set of coordinates for the other load lines in the field, offset by integral multiples of the normal base pitch, the sides of the superimposed trapezoids will intersect at their midpoints and have opposite slopes. As a result, the sum of the ordinates of the several overlapped trapezoids will be constant, and Condition 1 above is therefore met.

It will therefore be evident that there is a corollary to Condition 1, to the effect that if the gear silhouette generating lines are straight, the plots of load line length will have discontinuities such as the corners of the trapezoids described above. For a summation of load line aggregate length to remain constant, such discontinuities must be canceled out by other discontinuities that occur simultaneously. In other words, the load lines must always strike two or more corners of the field of contact simultaneously.

While the gear silhouettes will nearly always have straight line generators, for convenience and economy of machining the gear blanks, it is nevertheless equally possible to use curved generators. The crossed trapezoid sides of equal and opposite slope are not the only symmetrical shapes that add together to give a constant ordinate sum. A number of inflected curves such as sine squared curves displaced by 120° or 180° have the same property and will also satisfy Condition 1. The use of such a curve in the embodiment of FIGS. 4 and 5 would change the straight beveled tooth silhouette portions 54 and 55 into inflected s-shaped curves. In this case the "corners" of the field would be the beginning and end of the s-curves whether they were sharp discontinuities or smooth points of tangency.

To eliminate the second type of tooth load variation, the following condition must be met:

Condition 2, for maintaining a constant position of the tooth load resultant:

The change of moment of any load line with respect to a fixed point produced by a small rotation of the gears must be balanced by an equal and opposite change of moment produced simultaneously by at least one other load line.

Just as the variation in load line length can be plotted as indicated above, the product of load line length times load per unit length times moment arm with respect to a fixed moment center can be plotted and added to corresponding plots for other load lines indexed by one normal base pitch. For these several overlapped plots of moment contribution to give a constant total moment with respect to any given moment center (which is the requisite condition for a tooth load resultant that maintains the same line of action), the field of contact of any parallel axis gear set must be polar symmetrical, i.e., must be symmetrical about its centroid. If all the sides of the field of contact, or its projection into the axial plane as in FIG. 5, are straight, then the field is bounded by two or more sets of parallel lines, the intersections of which are aligned with the load lines for simultaneous striking as indicated above in connection with Condition 1.

A large number of fields meet the above two conditions, and examples are shown in FIGS. 6–17. The first of these, FIGS. 6–9, are useful for producing a constant tooth-load in helical gears. Which field willl be optimum for a given gear set will depend on the transverse and axial contact ratios and the base helix angle. Generally those that have one or more sides that are contained in the transverse plane will be the easiest to manufacture, but this is not essential to meeting the two required "Conditions" cited above. In all of these figures the broken lines are the load lines in the particular position in which they satisfy Condition 1.

FIG. 6 shows a field 61 that is useful when the axial contact ratio is less than unity. Projection onto the axial plane will give gear silhouettes for which the entire addendum surfaces are conical.

FIG. 7 is advantageous if the axial contact ratio is large. The short sides of the field 71 are proportioned to satisfy Conditions 1 and 2.

In the field 81 of FIG. 8 the addendum surfaces of the gears are cylindrical, but one end of each gear is made conical for the full tooth depth.

In FIG. 9 both the transverse and axial contact ratios are integral, so the field 91 is rectangular. While such a field would appear advantageous, it is not often practical. The only integral transverse contact ratios attainable are one and two. The first requires either severely truncated teeth or pinions with 6 to 8 teeth, depending on the working depth. The transverse contact ratios of two can only be obtained with 14 ½° teeth if the sum of the teeth on the mating pair is in the vicinity of 100, and cannot be obtained at all with standard full-depth 20° teeth. The use of non-standard working depths causes the form factors for the Lewis Equation to be invalid.

FIGS. 10 and 11 show fields 101 and 111 that are useful for spur gearing. In the latter field 111, the teeth have the unique characteristic of being long-addendum on one end and short addendum on the other. Both the hexahedral field 101 and the parallelogram field 111 will allow a spur gear to operate almost as quietly as a helical gear.

FIGS. 12 and 13 show field shapes 121, 131, for straight bevel gears. Projection of these fields 121, 131 onto the axial plane will give gear tooth silhouettes that have double conical addendum surfaces in the case of the six-sided field 121 and single conical addendum surfaces in the case of the four-sided field 131.

FIGS. 14 and 15 show analogous fields 141, 151 for spiral bevel gears. In this case the load lines 142, 143, 152, 153, are spiral but they still intersect the field corners simultaneously, three corners at a time in the six-sided field 141 and two corners at a time in the four-sided field 151.

FIGS. 16 and 17 show fields of contact 161, 171 for Novikov type gears. In this case the fields are not flat but cylindrical or elliptical and may be projected onto the axial plane by multiplying the axial dimensions by the cosine of the helix angle and radial dimensions by the cosine of the pressure angle. Basically the fields 161, 171 are made to satisfy the required Conditions 1 and 2 above by beveling the addendum surfaces for half the tooth working depth for a length equal to one axial pitch at each end of the teeth.

A number of points with respect to constant tooth-load gearing may be noted:

1. The smaller the total contact ratio (transverse contact ratio plus axial contact ratio), the greater are the advantages of having a constant resultant load, because without it the variations in tooth pressure per unit length of tooth are considerable.

2. While tooth crowning may be more effective than silhouette shaping as a means of accommodating shaft misalignment, the latter is more effective for stabilizing the tooth load cycle, especialy since it is not greatly affected by wear or variations in load. An example of a crowned tooth is U.S. Pat. No 3,454,394.

3. The position of the resultant is affected only slightly by wear. The greater sliding at profile points removed from the pitch line tends to cause all conjugate gears to become "pitch line prominent", but as this effect shifts the load closer to where the resultant acts, no great error is introduced into the theory.

4. The invention is applicable to both equal and unequal ("corrected") addendum gearing.

5. Gears embodying the invention are not sensitive to small deviations from the ideal theory, as the noise and vibration curves have minima that have rather gradual curvature. This means that the load lines do not have to strike the field corners at exactly the same time, but almost simultaneously. Further, in some applications it may actually prove somewhat advantageous to deviate from the ideal theory to correct for effects such as tooth deformation being at a maximum when the load is near the tip.

6. It will be evident from FIG. 5 that it is the overlapping portion of the teeth that forms the field. There is nothing to prevent one or the other gear being wider than its mate, as only the active face width F (FIGS. 2,3) is involved in defining the field boundaries.

7. With the exception of the field of FIG. 9, all of the fields defined in this specification are smaller in total area than the rectangle in which they can be inscribed. This means that the projection of these areas onto the axial plane will represent a smaller area of tooth overlap than is obtained with conventional gears, just as the overlap area in FIG. 5 is slightly smaller than that in FIG. 3. This does not mean, however, that the torque capacity of gears having these smaller fields is lower than that of conventional gears, except in cases where the pitch line velocity is so low that there is no significant dynamic load. The smoother action of constant-load gearing will usually compensate for the loss of effective tooth area.

8. It will be obvious that any desired field shape can be obtained by superficial relieving of portions of a rectangular silhouette tooth such as shown in FIG. 3 instead of beveling off part of the tooth ends or addendum surfaces as in FIG. 5. While it is considered that this approach is included in the spirit of the invention, it may be noted that it is not a preferred embodiment because it is more expensive to do and the field so produced is susceptible to alteration as the tooth surface wears.

9. If the contact areas between mating teeth embodying the invention were to be projected onto the axial plane, they would strike the corners of the tooth overlap areas (such as 51 in FIG. 5) always in groups of two or more corners simultaneously.

In the ensuing claims the following terms shall have the following meanings: "load line" is an edge view of the contact area between engaged teeth, except in the case of Novikov type gearing where it is a particular incremental element of the contact area; "field of contact" is a surface that is the locus of the load lines; "addendum surface" is a surface of revolution containing the top lands of the teeth, and may be a compound surface if the generating element of the surface of revolution has an angle or bend; "corner" is the intersection of adjacent sides of a field of contact, and does not preclude the use of a small chamfer or round at the ends of the teeth to reduce chipping or avoid burrs; "axial contact ratio" is the ratio of face width to axial pitch, i.e., face width times the tangent of the helix angle divided by the circular pitch.

It should be noted from the foregoing specification that the preferred embodiments of the invention all involve a non-rectangular field of contact, because the rectangular field can be achieved only by modifying standard tooth forms. The preferred embodiments therefore all have in common, because they are not rectangular, the feature of having at least one corner at which the boundaries of the field make an angle greater than 90°.

The specific description given above of the preferred form of the invention should not be taken as restrictive as it will be apparent that various modifications in design may be resorted to by those skilled in the art without departing from the scope of the following claims.

I claim:

1. In a pair of mating gears,
   teeth having working surfaces formed to contact on load lines,
   the locus of said load lines as said gears rotate comprising a field of contact,
   the boundaries of said working surfaces formed to provide a shape to said field that alters the length of each of said load lines as said gears rotate,
   the change of moment of any of said load lines produced by said shape in response to a small rotation of said gears being balanced by an equal and opposite change of moment produced simultaneously by at least one other of said load lines, said field being shaped to have at least one corner at which the boundaries of said field make an angle greater than 90°.

2. A pair of mating gears according to claim 1 wherein the change of length of any of said load lines produced by said shape in response to a small rotation of said gears is balanced out by a simultaneous opposite change of length of at least one other of said load lines.

3. A pair of mating gears according to claim 1 wherein said teeth are slantingly disposed with respect to the common pitch element of said pair.

4. A pair of mating gears according to claim 1 wherein said field of contact has at leat four corners, and said corners are positioned with respect to said load lines to be intersected by them, as said gears rotate, in groups of at least two corners at a time.

5. A pair of mating gears according to claim 4 wherein said groups comprise three corners.

6. A pair of mating gears according to claim 4 wherein said groups comprise four corners.

7. A pair of mating gears according to claim 1 wherein said field has six corners.

8. A pair of mating gears according to claim 1 wherein said field is formed by the intersection of at least two sets of parallel lines.

9. A pair of mating gears according to claim 1 wherein the axes of said gears are parallel.

10. A pair of mating gears according to claim 1 wherein the axes of said gears are intersecting.

11. A pair of mating gears according to claim 1 wherein at least one side of said field is curved.

12. A pair of mating gears according to claim 1 wherein said load lines are parallel.

13. A pair of mating gears according to claim 1 wherein said load lines are curved.

14. A pair of mating gears according to claim 1 wherein said field is formed by the intersection of three sets of parallel lines.

15. A pair of mating gears according to claim 1 wherein said gears are conjugate in the transverse plane.

16. A pair of mating gears according to claim 1 wherein said teeth have involute profiles.

17. A pair of mating gears according to claim 1 wherein the profiles of said gears are nonconjugate in the transverse plane and have concave-convex mating profiles as in the case of Novikov-type gears.

18. A pair of mating gears according to claim 1 wherein the length of said field in a direction normal to said load lines is substantially equal to an integral number of normal base pitch lengths.

19. A pair of mating gears according to claim 1 wherein said gears are spur gears and said teeth have a greater addendum height at one end than the other end.

20. A pair of mating gears according to claim 1 wherein neither the transverse nor the axial contact ratio is equal to an integer.

* * * * *